United States Patent
Quraeshi

(12) 
(10) Patent No.: US 6,394,745 B1
(45) Date of Patent: May 28, 2002

(54) STRAIGHT-BLADED VERTICAL AXIS WIND TURBINE

(76) Inventor: Saeed Quraeshi, 217, Bruton, Beaconsfield PQ (CA), H9W 1N1

( * ) Notice: Subject to any disclaimer, the term of this patent is extended or adjusted under 35 U.S.C. 154(b) by 0 days.

(21) Appl. No.: 09/580,197

(22) Filed: May 26, 2000

(51) Int. Cl.[7] ................................................. F03D 7/00
(52) U.S. Cl. ....................................... 415/4.1; 416/119
(58) Field of Search .................... 415/4.1, 4.2; 416/119

(56) References Cited

U.S. PATENT DOCUMENTS

| | | |
|---|---|---|
| 4,115,027 A | 9/1978 | Thomas |
| 4,197,055 A * | 4/1980 | Campbell .................... 416/119 |
| 4,299,537 A | 11/1981 | Evans |
| 4,718,821 A | 1/1988 | Clancy |
| 4,725,194 A | 2/1988 | Bartsch |
| 5,057,696 A | 10/1991 | Thomas |
| 5,126,584 A | 6/1992 | Ouellet |
| 5,332,925 A | 7/1994 | Thomas |
| 5,518,367 A * | 5/1996 | Verastegui ................... 416/119 |
| 5,993,157 A * | 11/1999 | Perfahl .................... 416/170 R |

* cited by examiner

*Primary Examiner*—John Kwon

(57) ABSTRACT

The present invention concerns a wind turbine device having two or more vertical blades as generally used to generate power that gives a self-regulating angular speed using a collective blade-pitch control system with common biasing springs indirectly connected to each of the blades. A multiple retainer struts attachment system is disclosed for each blade to limit the effects of bending stresses on the latter. A new robust blade mounting, construction and design method is also described for use in the present wind turbine device.

20 Claims, 3 Drawing Sheets

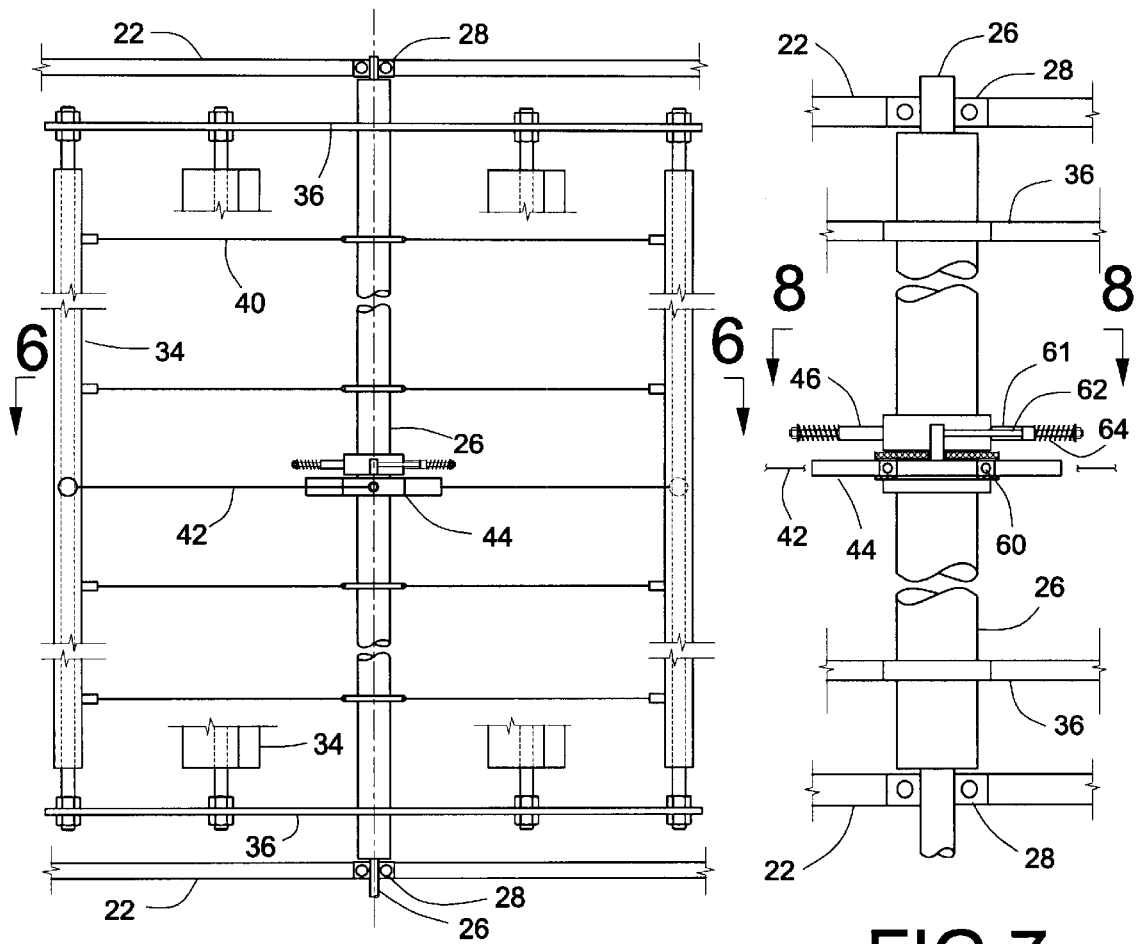
FIG.5
FIG.7
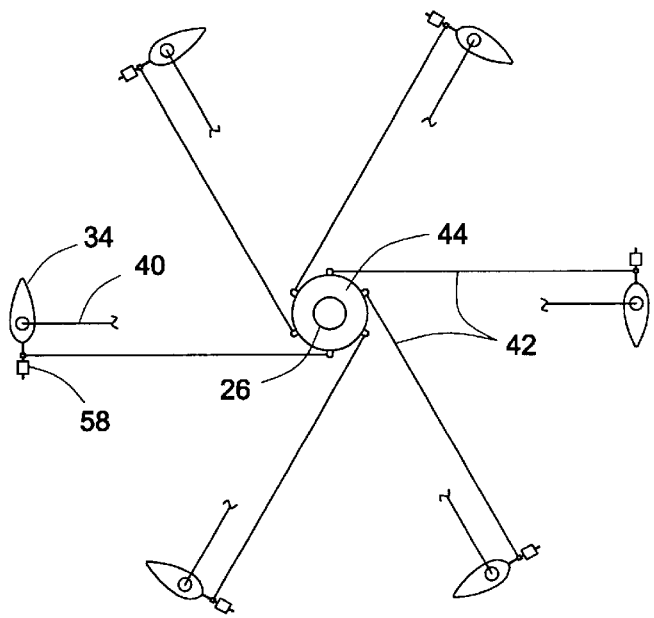
FIG.6
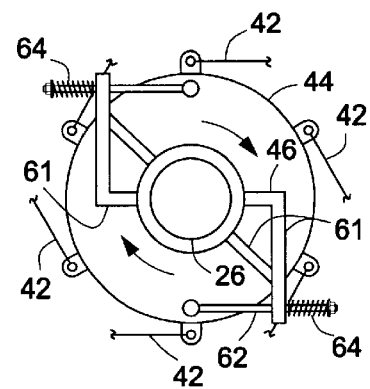
FIG.8

STRAIGHT-BLADED VERTICAL AXIS WIND TURBINE

FIELD OF THE INVENTION

The present invention relates to wind turbines, more specifically to a wind turbines with multiple straight blades around a substantially vertical axis and a collective blade-pitch control system therefor.

BACKGROUND OF THE INVENTION

Wind turbines commonly known as windmills have been used to produce power via a mechanical shaft for thousands of years. Vertical axis windmills are probably among the oldest of all. Many various types of arrangements have been created in recent years. Some modifying the design, construction or assembly of the blades, or modifying the attachment system between the support struts and the blades, or also modifying the blade-pitch control system regulating the angular speed of the blades.

In the U.S. Pat. No. 1,835,018 to Darrieus entitled "Turbine having its rotating shaft transverse to the flow of the current" and dated Dec. 8, 1931, the U.S. Pat. No. 4,299,537 to Evans entitled "Interlinked variable-pitch blades for windmills and turbines" and dated Nov. 10, 1981, the U.S. Pat. No. 4,718,821 to Clancy entitled "Windmill blade" and dated Jan. 12, 1988, the U.S. Patent 5,057,696 to Thomas entitled "Vertical windmill with omnidirectional diffusion" and dated Oct. 15, 1991, and the U.S. Pat. No. 5,126,584 to Ouellet entitled "Windmill", no specific design features are given to reinforce the construction of the blades themselves, except in Ouellet where a shaft goes through the blades, and in Thomas where a shaft goes through the external vertical stator to protect from high winds but not specifically inside the airfoils. In those cases, however, there is no system permitting for example to have for each blade assembly a strong rod and a light and resistant blade surrounding the rod. In Thomas the system of airfoils basically has to be protected by the use of the complex stators. In most cases however, robust and strong construction of all of the blades may mean heavier blades.

Furthermore, heavy blades, and long blades will both be a cause for higher bending stresses due to the centrifugal forces being exerted on the blades during the rotation of the rotor, often resulting in added cost in the construction of the blades and the turbine rotor. In the case of Ouellet however, a bracing ring solidifies the shutters, but part of the shutters are fixed. In the case of Thomas, upper and lower support bars are included in the system, but they are inserted in-between the vertical stators, preventing the stators or blades to have relatively large length or height. Clancy and Evans also both show struts to attach the blades, but this is done on the outside of the blade, necessitating a more rigid blade than if the attachment was done on a structural member inside the blade for example.

On wind turbines, a relatively strong design focus is also given to the pitch control of the blades to regulate speed and/or power output of the rotor. Some have a system where pitch control is individually provided for each blade, such as in Clancy, which subjects each blade to cyclic fluctuations during each rotation due to the variation of aerodynamic pressures acting on the blade during its rotation and could result in greater wear and tear on the blades and increased maintenance costs.

The pitch control system is also sometimes collective such as in Darnieus, Evans, Thomas and Ouellet. In Darrieus' invention, the pivoting blades are linked to an eccentric ring to give a possible oscillation on the blades when they are in rotation. This system is purely a blade pitch control system, as also in Evans' invention. In both inventions, the force of the wind is furthermore inducing the pitch control (via a system of linkages at the top of the central vertical shaft in Evans' case) as opposed to have the centrifugal forces acting in the pitch control.

In Thomas' invention, the centrifugal forces act upon an arm pivoting about the strut. As such, the arm does not tend to rotate the disk, which is activated via a loose cable, which becomes tight as the arm extends outwards. Furthermore, the pitching of the blades is finally achieved through a system of cables and cam sliding in a rail attached to the blade. The collective blade-pitch control is not in this case provided by centrifugal forces that tend to turn the disc and arise from centrifugal forces acting on the unbalanced blades and connecting rods. Ouellet's invention has a plurality of stationary and movable shutters arranged inside the rotor. Both previously mentioned inventions have a collective pitch control system requiring an elaborate mechanism including numerous cams and cables or toothed crown wheel and pinions.

OBJECTS OF THE INVENTION

It is therefore a general object of the present invention to provide a wind turbine device of the character described which obviates the above noted disadvantages.

Another object of the present invention is to provide a wind turbine device that provides a simple and effective collective blade-pitch control system induced by centrifugal forces to self-regulate the angular speed and/or power output of the rotor of the wind turbine.

A further object of the present invention is to provide a wind turbine device that provides a method of effective attachment of multiple retainer struts in order to limit the effects of centrifugal forces or bending stresses on the blades while keeping the blades' maximum effectiveness.

Another object of the present invention is to provide a wind turbine device that gives simple design and structural modifications to strengthen and lighten turbine blades.

Another object of the present invention is to provide a wind turbine device that has a support structure easily adaptable to receive more than one rotor assembly depending on the required output power.

SUMMARY OF THE INVENTION

The present invention is directed to a wind turbine device of the vertical axis type that comprises:
  a static support structure rotatably supporting a rotor assembly at its substantially vertical turbine drive shaft connected to a power generator member, the rotor assembly also includes;
  a plurality of vertical blade members equally and circumferencially spaced apart from and parallel to said shaft, said blade members having a leading and a trailing edges, said blade members being vertically pivotally mounted at their top and bottom extremities and close to said leading edge to respective rigid horizontal support struts to allow for a variable pitch angle of said blade members from a neutral position with said blade member being essentially tangential to said shaft, each of said horizontal support struts being fixedly radially secured to said shaft;
  a short horizontal arm secured at one end on respective of said blade members and substantially tangential to said shaft and secured at a second end to a first extremity of a respective rigid horizontal control rod;

a second extremity of each of said control rod is secured to a common control disc member rotatably mounted to said shaft; and a control disc biasing member secured to said shaft and biasing said control disc member against any positive common angular pivoting change of said pitch angle of said blade members about their respective pivoting axis.

Preferably, the second end of each of said short horizontal arms includes an adjustable weight member to allow for specific calibration of said blade member of said wind turbine device.

Preferably, each of the blade members includes a shaped external body having a leading and a trailing edges and a center of aerodynamic pressure loads therebetween, and being longitudinally pivotally mounted onto a substantially vertical post member at said center of pressure loads, said vertical post member being rigidly secured to respective said horizontal support struts, said leading edge of said external body having said one end of said respective short arm being secured thereto.

Preferably, each of the blade members further includes at least one substantially horizontal intermediate retainer member fixedly secured to said shaft at a first extremity and rotatably secured to said vertical post member of said blade member at a second extremity, said intermediate retainer members being equally spaced a part along said external body between said respective horizontal support struts and parallel to the latter.

Preferably, each of the vertical post members is located inside said respective external body that is pivotally mounted thereon, said external body of said blade member having at least one corresponding small opening allowing said second extremity of said intermediate support member to reach said vertical post member and a substantial free pivoting of said external body around said vertical post member with said pitch angle varying between zero and +25 degrees from said neutral position.

Preferably, each of the vertical post members includes an inner tube rigidly secured to said respective horizontal support struts at its extremities and an outer tube coaxial to said inner tube and rotatably secured therealong, said outer tube being rigidly secured to said external body and of essentially a same length thereof, said outer tube also having at least one corresponding small opening allowing said second extremity of said intermediate support member to reach said inner tube and a substantial free pivoting of said outer tube around said inner tube with said pitch angle varying between zero and +25 degrees from said neutral position.

Preferably, the control disc member is a generally round disc with a radius relatively smaller than the distance separating each of said blade members from said shaft such that each of said control rods is substantially parallel to said corresponding support struts, and said control disc biasing member includes a transverse bar rigidly secured to said shaft and abutting at least one pair of biasing springs axially supported by said round disc, said biasing springs biasing said control disc member and said blade members into said neutral position thereby controlling rotational speed of said shaft at a pre-determined speed for said power generator member.

Preferably, the short horizontal arms, said control rods, said control disc member and said control disc biasing member are substantially at mid vertical distance between said respective horizontal support struts.

BRIEF DESCRIPTION OF THE DRAWINGS

In the annexed drawings, like reference characters indicate like elements throughout.

FIG. 5 is an enlarged partially broken elevation view of the arrangement of the attachment of blade retainers and control rods with the control disc on the rotor shaft, and of the blade assembly on the wind turbine and its support structure;

FIG. 6 is a plan view taken along line 6—6 of FIG. 5;

FIG. 7 is an enlarged partially broken elevation view of the arrangement of the control disc and its biasing member on the drive shaft of the embodiment of FIG. 1; and FIG. 8 is a plan view taken along line 8—8 of FIG. 7.

DETAILED DESCRIPTION OF THE PREFERRED EMBODIMENT

Figure 1:
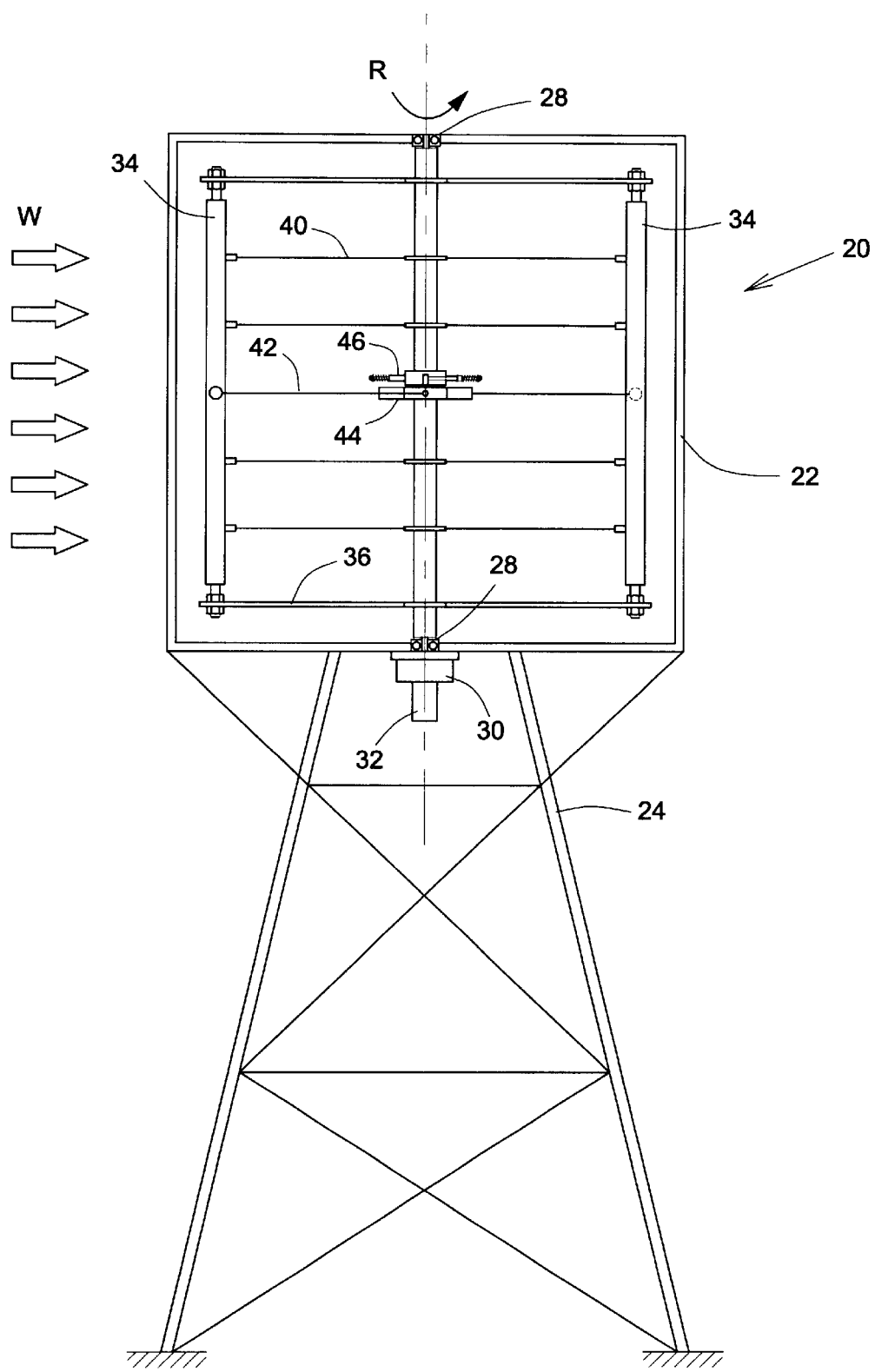
FIG. 1 is an elevation view of an embodiment according to a wind turbine of the present invention.

Referring to FIG. 1, there is shown an embodiment of turbine a wind device 20 according to the present invention with an upper static support structure 22 secured to a lower support structure 24. At the center of the upper support structure 22 is a rotatable vertical turbine drive shaft 26 secured thereto by typical bearing members 28 and preferably connected to a speed increaser or gearbox 30 also secured to the upper support structure 22. A power generator member 32 is furthermore mounted on the gearbox 30. It shall be understood that the drive shaft 26 may be a plurality of shaft sections (not shown) with mating flanges on them for preferably bolting the sections together.

The turbine drive shaft 26 supports the rotor assembly of the turbine device 20 that includes at least two, preferably six, blade members 34 substantially vertical and parallel to the shaft 26. The blade members 34 are equally and circumferencially spaced-apart from each other around that shaft 26. Each blade member 34 is vertically pivotally mounted at its extremities onto a pair of top and bottom rigid support struts 36, preferably horizontal and all secured to the shaft 26.

Figures 2, 4:
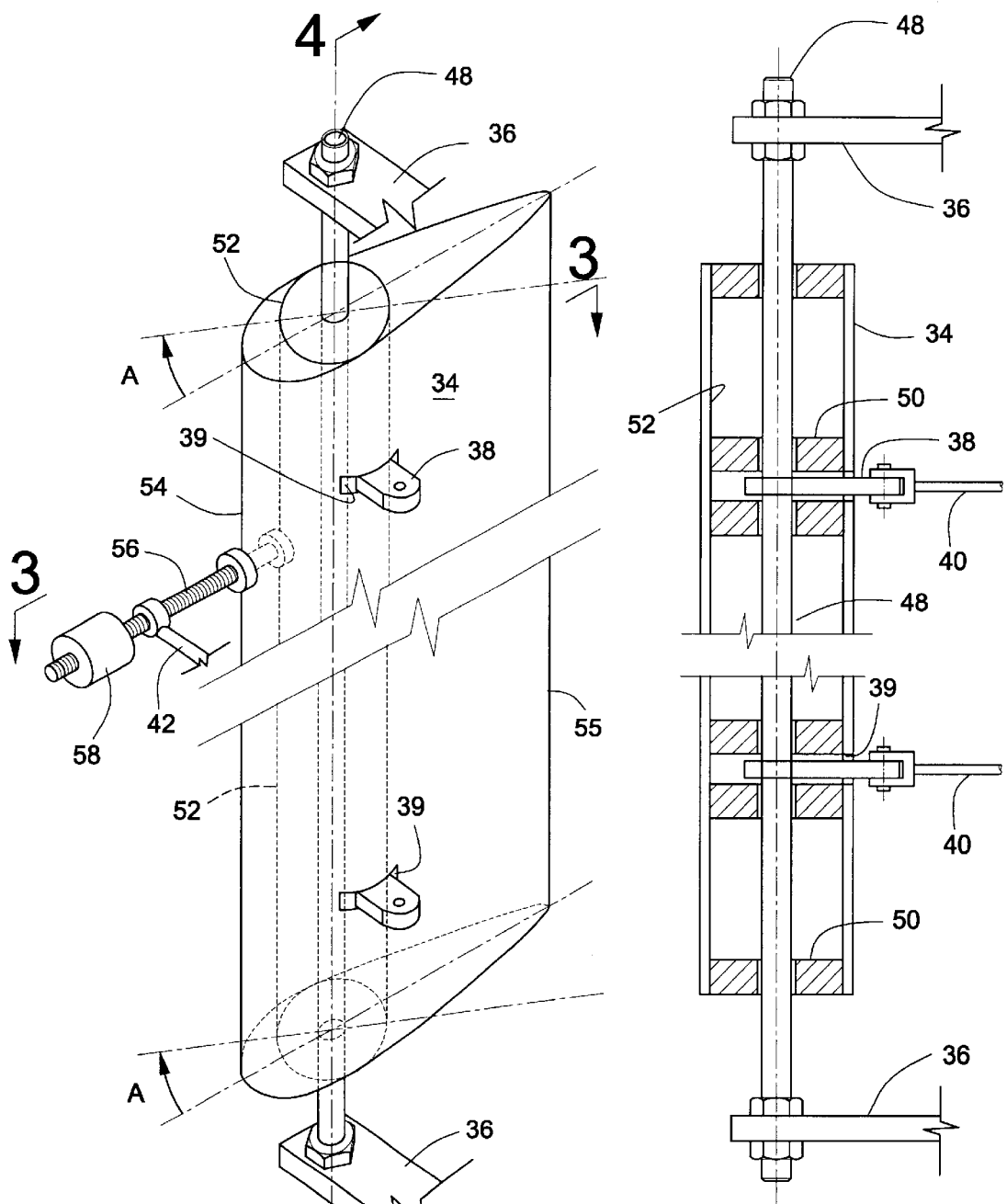
FIG. 2 is a partially broken perspective view of a blade assembly of the embodiment of FIG. 1 shown in its neutral position.
FIG. 4 is a partially broken elevation section view taken along line 4—4 of FIG. 2.

As shown in FIG. 2, each vertical blade 34 is secured to its horizontal support struts 36 at the extremities of an inner tube 48. A plurality of retainer attachment members, preferably support lugs 38 (shown on FIGS. 2, 3, and 4), are rigidly secured to the inner tube 48. A first extremity of a plurality of intermediate retainer members 40, preferably substantially horizontal, is preferably rotatably secured to one of the support lugs 38. The second extremity of each intermediate retainer members 40 is secured to the shaft 26. Each blade member 34 is linked to a common control disc member 44 rotatably secured to the shaft 26 via a horizontal control rod 42. The control disc member 44 is biased from free rotation by a control disc biasing member 46 secured to the shaft 26.

Figure 3:
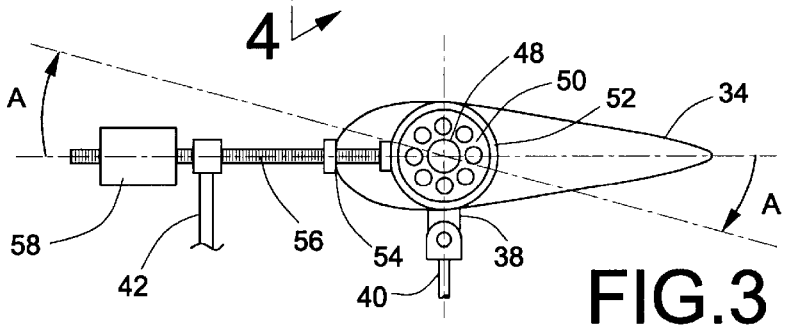
FIG. 3 is a top section view taken along line 3—3 of FIG. 2.

FIGS. 2, 3, and 4 show the details of the design surrounding the blade member 34. The vertical rigid inner tube 48 is secured between the support struts 36. A hollowed vertical outer tube 52 is rotatably secured on the inner tube 48, preferably by means of tube bearings or bushings 50, to form the vertical post member. The outer tube 52 is substantially coaxial to its inner tube 48. The shape external body of the blade 34, preferably of NACA airfoil shape configuration, is securely mounted on, preferably around, the outer tube 52 by standard attachment means, preferably riveting or welding, as to have the axis of the outer and inner tubes 52, 48 respectively at preferably approximately a quarter of the distance from the leading edge 54, or nose tip, to the trailing edge 55 of the shaped blade 34, from the leading edge 54. That location is the so-called center of aerodynamic pressure loads on the shaped blade 34 to help prevent dynamic oscillations in the pivoting of the blade 34 during the variations of the aerodynamic forces acting on that blade 34 when the turbine drive 26 shaft is rotating. The above-mentioned arrangement allows the blade 34 to angularly rotate as shown by angle A, the blade-pitch angle, around the vertical post member from its neutral position being essentially tangential to the shaft 26. A horizontal arm 56 is secured, at one of its ends, to the leading edge 54 of a corresponding blade member 34, and preferably also to further the outer tube 52 for better structural stability of the blade member 34, at a same horizontal level as the level of the control disc member 42. An adjustable counter balance weight member 58 is preferably attached onto the second end of the horizontal arm 56 to provide counter balancing to the blade 34. It is on the same second end of the horizontal arm 56 that is rigidly linked to the horizontal control rod 42. On the same figures it is shown that the support lugs 38 to which are rotatably secured the horizontal retainers 40 are secured on the inner tube 48 preferably in-between the tube bushings 50 and protrude through the blade 34 and the outer tube 52 via corresponding small openings 39. The small openings 39 allow for a small positive rotation of the blade 34 and its outer tube 52 around their inner tube 48 by a pitch angle between zero (0) (neutral position) to approximately plus twenty-five (+25) degrees. This allows the centrifugal loads due to the rotation of parts of the turbine 20 to be shared between the horizontal retainers 40 substantially spaced-apart and limit the effect of bending stresses on the blade 34. Obviously, the higher the number of struts provided, the more the effect of the bending stresses shall be dissipated between the retainers 40 of the turbine device 20.

FIGS. 5, 6, 7, and 8 show the details of the collective, or common, blade-pitch control system used in order to achieve self-regulating angular speed and/or power output of the rotor or turbine drive shaft 26. Each control rod 42 is secured to the common control disc 44 preferably in such a way that in neutral position it is tangential to the control disc 44 and substantially parallel to its respective support struts 36. The control and preferably round disc 44 is rotatably secured on the shaft 26 using preferably a disc bearing 60 and thereby accommodates any pivoting action, blade-pitch angle variation, of the blades 34. The control disc 44 is held in that neutral position by the control disc biasing member 46. The latter includes a transverse bar 61 substantially located in close proximity to the control disc 44 and abutting a pair, preferably only one, of biasing springs 64. Holding rods 62 are preferably pivotally mounted onto the control disc 44 at one end and carry a pair of axially mounted biasing springs 64 abutting the transverse bar 61. The control disc 44 is initially held in a predetermined neutral position by the selected desired setting at a certain value of the biasing springs 64 as determined by the requirements for the speed control of the turbine shaft 26.

During the rotation of the turbine rotor, the pivotal actions of the blades 34 around the respective inner tube 48 due to the unbalanced centrifugal forces acting on the blades 34 are restrained and the blades 34 are held in a fixed position by the counteracting compression in the biasing springs 64. Whenever the wind speed exceeds the rated wind speed conditions, there is an increase in the aerodynamic forces acting on the blades 34 that exert additional pressure on the blades 34 and increase the rotation speed of the turbine shaft 26, which then result in an increase of the unbalanced centrifugal forces acting on the blades 34 and the counter balance weight members 58. These additional centrifugal forces tend to pivot the blades 34 (increase the blade-pitch angle) and force the control rods 42 to exert an additional collective tangential pull on the control disc 44. The latter is counter reacted by the compression of the biasing springs 64 that allow the control disc 44 to rotate in a controlled manner and allow the blades 34 to pivot within a certain limit, set by the spring-rate of the biasing springs 64, thus resulting in a decrease in the aerodynamic forces acting on the blades 34 to decrease and re-establish the rotation speed of the turbine shaft 26 within a plus or minus percentage of its rated rotational speed.

Finally, as it can be seen on FIGS. 1 and 8, when the wind W acts on the blades 34 to force them into a shaft rotation R. Upon excessive speed, the control disc 44 will temporarily be forced to further rotate in the rotational direction R' against the compression of the biasing springs 64.

Although the embodiment 20 shown in FIG. 1 has only one rotor assembly, it is understood that a person skilled in the art could easily provide an upper static support structure 22 adapted to receive either two or three similar rotor assemblies installed on top of each other on a same turbine drive shaft 24, with respective bearing members 26.

Although an embodiment has been described herein with some particularity and details, many modifications and variations of the preferred embodiment are possible without deviating from the scope of the present invention.

I claim:

1. A wind turbine device of the vertical axis type comprising:

a static support structure rotatably supporting a rotor assembly at its substantially vertical turbine drive shaft connected to a power generator member, the rotor assembly also includes;

a plurality of vertical blade members equally and circumferencially spaced apart from and parallel to said shaft, said blade members having a leading and a trailing edges, said blade members being vertically pivotally mounted at their top and bottom extremities and close to said leading edge to respective rigid horizontal support struts to allow for a variable pitch angle of said blade members from a neutral position with said blade member being essentially tangential to said shaft, each of said horizontal support struts being fixedly radially secured to said shaft;

a short horizontal arm secured at one end on respective of said blade members and substantially tangential to said shaft and secured at a second end to a first extremity of a respective rigid horizontal control rod;

a second extremity of each of said control rod is secured to a common control disc member rotatably mounted to said shaft; and a control disc biasing member secured to said shaft and biasing said control disc member against any positive common angular pivoting change of said pitch angle of said blade members about their respective pivoting axis.

2. A device as defined in claim 1, wherein said second end of each of said short horizontal arms includes an adjustable weight member to allow for specific calibration of said blade member of said wind turbine device.

3. A device as defined in claim 2, wherein each of said blade members includes a shaped external body having a leading and a trailing edges and a center of aerodynamic pressure loads therebetween, and being longitudinally pivotally mounted onto a substantially vertical post member at said center of pressure loads, said vertical post member being rigidly secured to respective said horizontal support struts, said leading edge of said external body having said one end of said respective short arm being secured thereto.

4. A device as defined in claim 3, wherein each of said blade members further includes at least one substantially horizontal intermediate retainer member fixedly secured to said shaft at a first extremity and rotatably secured to said vertical post member of said blade member at a second extremity, said intermediate retainer members being equally spaced apart along said external body between said respective horizontal support struts and parallel to the latter.

5. A device as defined in claim 3, wherein each of said vertical post members is located inside respective said external body that is pivotally mounted thereon.

6. A device as defined in claim 4, wherein each of said vertical post members is located inside said respective external body that is pivotally mounted thereon, said external body of said blade member having at least one corresponding small opening allowing said second extremity of said intermediate support member to reach said vertical post member and a substantial free pivoting of said external body around said vertical post member with said pitch angle varying between zero and +25 degrees from said neutral position.

7. A device as defined in claim 5, wherein each of said vertical post members includes an inner tube rigidly secured to said respective horizontal support struts at its extremities and an outer tube coaxial to said inner tube and rotatably secured therealong, said outer tube being rigidly secured to said external body and of essentially a same length thereof.

8. A device as defined in claim 6, wherein each of said vertical post members includes an inner tube rigidly secured to said respective horizontal support struts at its extremities and an outer tube coaxial to said inner tube and rotatably secured therealong, said outer tube being rigidly secured to said external body and of essentially a same length thereof, said outer tube also having at least one corresponding small opening allowing said second extremity of said intermediate support member to reach said inner tube and a substantial free pivoting of said outer tube around said inner tube with said pitch angle varying between zero and +25 degrees from said neutral position.

9. A device as defined in claim 1, wherein said control disc member is a generally round disc with a radius relatively smaller than the distance separating each of said blade members from said shaft such that each of said control rods is substantially parallel to said corresponding support struts, and said control disc biasing member includes a transverse bar rigidly secured to said shaft and abutting at least one pair of biasing springs axially supported by said round disc, said biasing springs biasing said control disc member and said blade members into said neutral position thereby controlling rotational speed of said shaft at a pre-determined speed for said power generator member.

10. A device as defined in claim 7, wherein said control disc member is a generally round disc with a radius relatively smaller than the distance separating each of said blade members from said shaft such that each of said control rods is substantially parallel to said corresponding support struts, and said control disc biasing member includes a transverse bar rigidly secured to said shaft and abutting at least one pair of biasing springs axially supported by said round disc, said biasing springs biasing said control disc member and said blade members into said neutral position thereby controlling rotational speed of said shaft at a pre-determined speed for said power generator member.

11. A device as defined in claim 8, wherein said control disc member is a generally round disc with a radius relatively smaller than the distance separating each of said blade members from said shaft such that each of said control rods is substantially parallel to said corresponding support struts, and said control disc biasing member includes a transverse bar rigidly secured to said shaft and abutting at least one pair of biasing springs axially supported by said round disc, said biasing springs biasing said control disc member and said blade members into said neutral position thereby controlling rotational speed of said shaft at a pre-determined speed for said power generator member.

12. A device as defined in claim 1, wherein said short horizontal arms, said control rods, said control disc member and said control disc biasing member are substantially at mid vertical distance between said respective horizontal support struts.

13. A device as defined in claim 11, wherein said short horizontal arms, said control rods, said control disc member and said control disc biasing member are substantially at mid vertical distance between said respective horizontal support struts.

14. A wind turbine device of the vertical axis type comprising:
   a static support structure rotatably supporting a rotor assembly at its substantially vertical turbine drive shaft connected to a power generator member, the rotor assembly includes;
   a plurality of vertical blade members equally and circumferencially spaced apart from and parallel to said shaft, said blade members having a leading and a trailing edges, said blade members being vertically pivotally mounted at their top and bottom extremities and close to said leading edge to respective rigid horizontal support struts to allow for a variable pitch angle of said blade members from a neutral position with said blade member being essentially tangential to said shaft, each of said horizontal support struts being fixedly radially secured to said shaft, each of said blade members includes a shaped external body having a leading and a trailing edges and a center of aerodynamic pressure loads therebetween, and being longitudinally pivotally mounted onto a substantially vertical post member at said center of pressure loads, said vertical post member being rigidly secured to respective said horizontal support struts; and
   at least one substantially horizontal intermediate retainer member fixedly secured to said shaft at a first extremity and rotatably secured to said vertical post member of said blade member at a second extremity, said intermediate retainer members being equally spaced apart along said external body between said respective horizontal support struts and parallel to the latter.

15. A wind turbine device of the vertical axis type comprising:
   a static support structure rotatably supporting a rotor assembly at its substantially vertical turbine drive shaft connected to a power generator member, the rotor assembly includes;

a plurality of vertical blade members equally and circumferencially spaced apart from and parallel to said shaft, said blade members having a leading and a trailing edges, said blade members being vertically pivotally mounted at their top and bottom extremities and close to said leading edge to respective rigid horizontal support struts to allow for a variable pitch angle of said blade members from a neutral position with said blade member being essentially tangential to said shaft, each of said horizontal support struts being fixedly radially secured to said shaft, each of said blade members includes a shaped external body having a leading and a trailing edges and a center of aerodynamic pressure loads therebetween, and being longitudinally pivotally mounted onto a substantially vertical post member at said center of pressure loads, said vertical post member being rigidly secured to respective said horizontal support struts;

at least one substantially horizontal intermediate retainer member fixedly secured to said shaft at a first extremity and rotatably secured to said vertical post member of said blade member at a second extremity, said intermediate retainer members being equally spaced a part along said external body between said respective horizontal support struts and parallel to the latter;

a short horizontal arm secured at one end on respective said leading edge of said external body of each of said blade members and substantially tangential to said shaft and secured at a second end to a first extremity of a respective rigid horizontal control rod;

a second extremity of each of said control rod is secured to a common control disc member rotatably mounted to said shaft; and a control disc biasing member secured to said shaft and biasing said control disc member against any positive common angular pivoting change of said pitch angle of said blade members about their respective pivoting axis.

16. A device as defined in claim 15, wherein said second end of each of said short horizontal arms includes an adjustable weight member to allow for specific calibration of said blade member of said wind turbine device.

17. A device as defined in claim 15, wherein each of said vertical post members is located inside said respective external body that is pivotally mounted thereon, said external body of said blade member having at least one corresponding small opening allowing said second extremity of said intermediate support member to reach said vertical post member and a substantial free pivoting of said external body around said vertical post member with said pitch angle varying between zero and +25 degrees from said neutral position.

18. A device as defined in claim 17, wherein each of said vertical post members includes an inner tube rigidly secured to said respective horizontal support struts at its extremities and an outer tube coaxial to said inner tube and rotatably secured therealong, said outer tube being rigidly secured to said external body and of essentially a same length thereof, said outer tube also having at least one corresponding small opening allowing said second extremity of said intermediate support member to reach said inner tube and a substantial free pivoting of said outer tube around said inner tube with said pitch angle varying between zero and +25 degrees from said neutral position.

19. A device as defined in claim 15, wherein said control disc member is a generally round disc with a radius relatively smaller than the distance separating each of said blade members from said shaft such that each of said control rods is substantially parallel to said corresponding support struts, and said control disc biasing member includes a transverse bar rigidly secured to said shaft and abutting at least one pair of biasing springs axially supported by said round disc, said biasing springs biasing said control disc member and said blade members into said neutral position thereby controlling rotational speed of said shaft at a pre-determined speed for said power generator member.

20. A device as defined in claim 18, wherein said short horizontal arms, said control rods, said control disc member and said control disc biasing member are substantially at mid vertical distance between said respective horizontal support struts.

* * * * *